(12) United States Patent
Kawaguchi

(10) Patent No.: US 8,853,315 B2
(45) Date of Patent: Oct. 7, 2014

(54) PRESSURE-SENSITIVE ADHESIVE SHEET

(75) Inventor: Yasuhiko Kawaguchi, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/697,183

(22) PCT Filed: May 24, 2011

(86) PCT No.: PCT/JP2011/061809
§ 371 (c)(1),
(2), (4) Date: Nov. 9, 2012

(87) PCT Pub. No.: WO2011/148917
PCT Pub. Date: Dec. 1, 2011

(65) Prior Publication Data
US 2013/0066004 A1    Mar. 14, 2013

(30) Foreign Application Priority Data

May 26, 2010  (JP) ................................. 2010-120964
May 26, 2010  (JP) ................................. 2010-120965

(51) Int. Cl.
| | |
|---|---|
| C08K 3/26 | (2006.01) |
| C09J 133/06 | (2006.01) |
| C09J 11/04 | (2006.01) |
| C09J 135/04 | (2006.01) |
| C08K 3/22 | (2006.01) |
| C08K 5/00 | (2006.01) |

(52) U.S. Cl.
CPC .................. *C09J 135/04* (2013.01); *C08K 3/22* (2013.01); *C08K 3/26* (2013.01); *C08K 5/0016* (2013.01); *C09J 133/06* (2013.01); *C09J 11/04* (2013.01)
USPC ............ 524/427; 524/425; 524/430; 524/433

(58) Field of Classification Search
USPC .................. 524/424, 425, 430, 433, 426, 427
See application file for complete search history.

(56) References Cited

U.S. PATENT DOCUMENTS

| | | | |
|---|---|---|---|
| 4,453,997 A * | 6/1984 | Hori et al. ...................... | 156/305 |
| 6,018,010 A | 1/2000 | Yamazaki et al. | |
| 7,955,471 B2 | 6/2011 | Kesselmayer | |
| 2007/0020474 A1 | 1/2007 | Tosaki et al. | |
| 2009/0274747 A1 * | 11/2009 | Yasukochi et al. ............ | 424/448 |
| 2010/0040777 A1 * | 2/2010 | Yamaguchi et al. ....... | 427/208.2 |

FOREIGN PATENT DOCUMENTS

| | | | |
|---|---|---|---|
| CN | 1550533 A | 12/2004 | |
| CN | 1900198 A | 1/2007 | |
| JP | 47-44017 | * 11/1972 | |
| JP | 47-44017 B2 | 12/1972 | |
| JP | 55-102668 A | 8/1980 | |
| JP | 55-113562 A | 9/1980 | |
| JP | 5-25450 A | 2/1993 | |
| JP | 9-12606 A | 1/1997 | |
| JP | 2001-207146 A | 7/2001 | |
| JP | 2005-290264 A | 10/2005 | |
| JP | 2008-031437 A | 2/2008 | |
| JP | 2008-120964 A | 5/2008 | |

OTHER PUBLICATIONS

"Metal ion cross-linking resin", <<Functional acrylic acid resin>>, Zhang Yuchuan et al. translated, pp. 94-97, Chemical industry press, Dec. 1993.
First Office Action issued by SIPO on Sep. 3, 2013, in connection with corresponding Chinese Patent Application No. 201180025281.0.
Notification of Reasons for Refusal issued by JPO on Mar. 11, 2014 in connection with corresponding Japanese Patent Application No. 2010-120964.
Second Office Action issued by SIPO of China on May 21, 2014 in connection with corresponding Chinese Patent Application No. 201180025281.0.

* cited by examiner

*Primary Examiner* — Peter Szekely
(74) *Attorney, Agent, or Firm* — Jean C. Edwards, Esq.; Edwards Neils PLLC

(57) ABSTRACT

A pressure-sensitive adhesive sheet is made from an adhesive composition containing a carboxyl group-containing polymer having a carboxyl group, a plasticizer, and a metal oxide-containing component containing a metal oxide and/or a metal carbonate, and is obtained by allowing the adhesive composition to moisture-cure.

4 Claims, No Drawings

PRESSURE-SENSITIVE ADHESIVE SHEET

CROSS-REFERENCE TO RELATED APPLICATIONS

The present application is a 35 U.S.C. 371 National Stage Entry of parent PCT Application No. PCT/JP2011/061809, which was filed May 24, 2011, which claims priority from Japanese Patent Application Nos. 2010-120964 and 2010-120965, both filed on May 26, 2010, all the contents of which are herein incorporated by reference herein in their entirety.

TECHNICAL FIELD

The present invention relates to a pressure-sensitive adhesive sheet, to be specific, to a pressure-sensitive adhesive sheet used in adhesion of various members.

BACKGROUND ART

Conventionally, a pressure-sensitive adhesive sheet has been widely used in adhesion of various members.

For example, an adhesive film which is formed by blending calcium oxide into a pressure-sensitive adhesive solution prepared by polymerizing 2-ethylhexyl acrylate and acrylic acid in toluene and then by being applied and dried has been proposed (ref: for example, the following Patent Document 1).

Also, an adhesive layer which is formed by blending an isocyanate cross-linking agent into a polymer-based solution prepared by polymerizing butyl acrylate and acrylic acid into ethyl acetate to obtain a pressure-sensitive adhesive composition and then by being applied and dried has been proposed (ref: for example, the following Patent Document 2).

The adhesive film proposed in Patent Document 1 or the adhesive layer proposed in Patent Document 2 are attached to various members at the time of use and subsequently are humidified with moisture, so that the adhesive force is developed.

PRIOR ART DOCUMENT

Patent Document

Patent Document 1: Japanese Unexamined Patent Publication No. S55-113562
Patent Document 2: Japanese Unexamined Patent Publication No. H5-25450

SUMMARY OF THE INVENTION

Problems to be Solved by the Invention

However, there is a disadvantage that the adhesive film in the above-described Patent Document 1 or the adhesive layer in the above-described Patent Document 2 are required to be sealed off in order to prevent the moisture curing after formation and before use, so that they require additional procedures.

Also, the isocyanate cross-linking agent is blended into the adhesive layer in the above-described Patent Document 2, so that the adhesive layer may foam at the time of curing.

On the other hand, in view of reducing environmental burdens, it has been considered that the pressure-sensitive adhesive composition in Patent Document 2 is prepared without using the ethyl acetate to be formed into a film shape. However, in such a case, there is a disadvantage that the pressure-sensitive adhesive composition is cured at the time of formation.

It is an object of the present invention to provide a pressure-sensitive adhesive sheet which is capable of being easily formed into a predetermined shape, is easily stored after formation and before use, and has an excellent adhesive force and an excellent holding strength at high temperature.

Solution to the Problems

In order to achieve the above-described object, a pressure-sensitive adhesive sheet of the present invention is made from an adhesive composition containing a carboxyl group-containing polymer having a carboxyl group, a plasticizer, and a metal oxide-containing component containing a metal oxide and/or a metal carbonate, and is obtained by allowing the adhesive composition to moisture-cure.

In the pressure-sensitive adhesive sheet of the present invention, it is preferable that the following gel fraction thereof is 30 mass % or more.

Gel fraction: the percentage of the dry mass of the toluene-insoluble component at the time when the pressure-sensitive adhesive sheet is immersed in toluene for 24 hours with respect to the mass of the pressure-sensitive adhesive sheet before the immersion In the pressure-sensitive adhesive sheet of the present invention, it is preferable that the adhesive composition is obtained by humidification after being formed into a sheet shape.

In the pressure-sensitive adhesive sheet of the present invention, it is preferable that the adhesive composition is formed into a sheet shape after being prepared by a solventless process.

In the pressure-sensitive adhesive sheet of the present invention, it is preferable that the carboxyl group is contained in the carboxyl group-containing polymer at a content ratio of 0.1 to 10 mass %.

In the pressure-sensitive adhesive sheet of the present invention, it is preferable that the carboxyl group-containing polymer is obtained by polymerizing a monomer composition containing 45 to 90 mass % of an alkyl (meth)acrylate monomer, 0.1 to 10 mass % of a carboxyl group-containing vinyl monomer, and 5 to 50 mass % of a cyano group-containing vinyl monomer.

In the pressure-sensitive adhesive sheet of the present invention, it is preferable that the adhesive composition further contains a tackifier.

In the pressure-sensitive adhesive sheet of the present invention, it is preferable that the metal oxide is an oxide of a Group 2 element.

In the pressure-sensitive adhesive sheet of the present invention, it is preferable that the metal carbonate is a calcium carbonate.

Effect of the Invention

The pressure-sensitive adhesive sheet of the present invention is capable of being easily formed into a predetermined shape, is easily stored after formation and before use, and can develop an excellent adhesive force with respect to an object to be adhered and an excellent holding strength at high temperature.

EMBODIMENT OF THE INVENTION

A pressure-sensitive adhesive sheet of the present invention can be obtained by moisture-curing an adhesive composition.

In the present invention, the adhesive composition contains a carboxyl group-containing polymer having a carboxyl group, a plasticizer, and a metal oxide-containing component containing a metal oxide and/or a metal carbonate.

An example of the carboxyl group-containing polymer includes a polymer (a rubber or a resin) obtained by carboxyl-modifying an isoprene rubber, a butadiene rubber, an acrylonitrile-butadiene rubber, a styrene-butadiene rubber, a styrene-butadiene-styrene block polymer, a styrene-isoprene-styrene block polymer, or an acrylic polymer. Preferably, a carboxyl-modified acrylic polymer is used.

The carboxyl-modified acrylic polymer is obtained by polymerizing a monomer composition containing an alkyl (meth)acrylate monomer ((meth)acrylate is defined as acrylate and/or meth acrylate, hereinafter the same) and a carboxyl group-containing vinyl monomer.

An example of the alkyl (meth)acrylate includes an alkyl (meth)acrylate containing a straight chain or branched chain alkyl group having 2 to 12 carbon atoms such as ethyl (meth)acrylate, propyl (meth)acrylate, isopropyl (meth)acrylate, butyl (meth)acrylate, isobutyl (meth)acrylate, sec-butyl (meth)acrylate, t-butyl (meth)acrylate, pentyl (meth)acrylate, neopentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, and lauryl (meth)acrylate. Preferably, an alkyl (meth)acrylate containing a straight chain or branched chain alkyl group having 2 to 4 carbon atoms such as ethyl (meth)acrylate, propyl (meth)acrylate, isopropyl (meth)acrylate, butyl (meth)acrylate, isobutyl (meth)acrylate, sec-butyl (meth)acrylate, and t-butyl (meth)acrylate is used.

Examples of the carboxyl group-containing vinyl monomer include an unsaturated carboxylic acid such as (meth)acrylic acid, fumaric acid, maleic acid, itaconic acid, crotonic acid, and cinnamic acid and an unsaturated dicarboxylic anhydride such as fumaric acid anhydride, maleic acid anhydride, and itaconic acid anhydride.

The monomer composition can contain a monomer copolymerizable with the above-described monomer. Examples of the monomer include a reactive functional group-containing vinyl monomer and a polyfunctional vinyl monomer. Preferably, a reactive functional group-containing vinyl monomer is used.

Examples of the reactive functional group-containing vinyl monomer include a cyano group-containing vinyl monomer such as (meth)acrylonitrile; a hydroxyl group-containing vinyl monomer such as 2-hydroxyethyl acrylate, 2-hydroxypropyl acrylate, and 4-hydroxybutyl acrylate; an epoxy group-containing vinyl monomer such as glycidyl (meth)acrylate, methylglycidyl (meth)acrylate, and glycerin di(meth)acrylate; an amino group-containing vinyl monomer such as aminoethyl (meth)acrylate and dimethylaminoethyl (meth)acrylate; an isocyanate group-containing vinyl monomer such as 2-methacryloyloxyethylisocyanate; an amide group-containing vinyl monomer such as (meth)acrylamide; and a maleimide-based imide group-containing vinyl monomer such as N-cyclohexylmaleimide and N-isopropylmaleimide. Preferably, a cyano group-containing vinyl monomer is used.

Examples of the polyfunctional vinyl monomer include (mono- or poly-) alkylene polyol poly(meth)acrylate such as ethyleneglycol di(meth)acrylate, diethyleneglycol di(meth)acrylate, triethyleneglycol di(meth)acrylate, trimethylolpropane tri(meth)acrylate, tetraethyleneglycol di(meth)acrylate, neopentylglycol di(meth)acrylate, 1,6-hexanediol di(meth)acrylate, pentaerythritol di(meth)acrylate, tetramethylolmethane tri(meth)acrylate, and dipentaerythritol hexa(meth)acrylate.

The monomer composition contains, for example, 45 to 99.9 mass %, or preferably 90 to 99 mass % of the alkyl (meth)acrylate monomer and, for example, 0.1 to 55 mass %, or preferably 1 to 10 mass % of the carboxyl group-containing vinyl monomer. When a copolymerizable monomer is contained in the monomer composition, the mixing ratio thereof is, for example, below 55 mass %.

When a cyano group-containing vinyl monomer, as a copolymerizable monomer, is contained in the monomer composition, the monomer composition contains, for example, 45 to 90 mass %, or preferably 70 to 85 mass % of the alkyl (meth)acrylate monomer; for example, 0.1 to 10 mass %, or preferably 0.5 to 7 mass % of the carboxyl group-containing vinyl monomer; and 5 to 50 mass %, or preferably 10 to 25 mass % of the cyano group-containing vinyl monomer.

A known method may be used as the polymerization method of the acrylic polymer and, for example, suspension polymerization, bulk polymerization, or emulsion polymerization can be appropriately selected.

In the polymerization of the acrylic polymer, a known polymerization initiator, reaction solvent, chain transfer agent, or emulsifier can be appropriately used as required. When a reaction solvent is used in the polymerization of the acrylic polymer, the reaction solvent is distilled off after the reaction by a method such as distillation.

The carboxyl group-containing polymer contains, for example, 0.1 to 10 mass %, or preferably 0.5 to 5.0 mass % of the carboxyl group.

When the content of the carboxyl group is below the above-described range, the adhesive composition cannot be sufficiently moisture-cured, so that the properties (the adhesive force, the holding strength, or the like) of the pressure-sensitive adhesive sheet may be reduced. When the content of the carboxyl group exceeds the above-described range, the glass transition point (Tg) of the calboxyl group-containing polymer excessively increases, while the moisture curing rate increases, so that the carboxyl group-containing polymer may be excessively hardened at normal temperature.

The plasticizer is not particularly limited as long as it is capable of plasticizing the carboxyl group-containing polymer. Examples of the plasticizer include a phthalate plasticizer and an aliphatic plasticizer.

An example of the phthalate plasticizer includes a phthalate ester such as dioctyl phthalate (DOP), dioctyl tin laurate (DOTL), dibutyl phthalate (DBP), dilauryl phthalate (DLP), butyl benzyl phthalate (BBP), diisodecyl phthalate (DIDP), diisononyl phthalate (DINP), dimethyl phthalate, and diethyl phthalate.

An example of the aliphatic plasticizer includes an adipate such as dioctyl adipate (DOA), diisononyl adipate (DINA), diisodecyl adipate, adipic acid propylene glycol polyester, and adipic acid butylene glycol polyester.

Examples of the plasticizer include higher alcohols (for example, lauryl alcohol, stearyl alcohol, and the like); drying oils and oils extracted from animals and plants (for example, paraffins (paraffin-based oil and the like)), waxes, naphthene, aroma, asphalts, linseed oils, and the like); petroleum-based oils; low molecular weight polymers; and organic acid esters (for example, phosphoric ester, higher aliphatic acid ester, alkyl sulfonic acid ester, and the like).

The plasticizers can be used alone or in combination of two or more. As the plasticizer, preferably, an aliphatic plasticizer is used, or more preferably, an adipate is used.

The plasticizer is blended at a mixing ratio of, for example, 10 to 300 parts by mass, or preferably 25 to 150 parts by mass with respect to 100 parts by mass of the carboxyl group-containing polymer.

When the mixing proportion of the plasticizer is below the above-described range, the adhesive force of the pressure-sensitive adhesive sheet may be reduced. When the mixing proportion of the plasticizer exceeds the above-described range, the gel fraction (described later) of the adhesive composition is not in a desired range and the holding strength (described later) may be reduced.

An example of the metal oxide which is contained in the metal oxide-containing component includes an oxide of a Group 2 element (a Group 2 element of the periodic table (Revised edition of IUPAC Inorganic Chemistry Nomenclature (1989)) such as a calcium oxide, a magnesium oxide, a strontium oxide, and a barium oxide.

When the metal oxide is the oxide of the Group 2 element, a metal hydroxide can be produced by the reaction of water with the metal oxide and a cross-link can be formed by an ion bond of a metal ion in the metal hydroxide with a carboxyl group in the carboxyl group-containing polymer.

Therefore, the metal oxide-containing component serves as a curing agent (or a cross-linking curing agent) of the moisture curing.

The metal oxide-containing component may be the metal oxide itself (containing 100% of the metal oxide) and can be prepared as a mixture in which a metal oxide is mixed.

Examples of the mixture of the metal oxide include a portland cement (containing, as a metal oxide, CaO, $SiO_2$, $Al_2O_3$, and $Fe_2O_3$) such as a white portland cement; a mixed cement such as a portland blast furnace cement (containing, as a metal oxide, CaO, $SiO_2$, $Al_2O_3$, $Fe_2O_3$, and MgO), a fly ash cement (containing, as a metal oxide, CaO, $SiO_2$, $Al_2O_3$, $Fe_2O_3$, and MgO), and a silica cement (containing, as a metal oxide, CaO, $SiO_2$, $Al_2O_3$, and $Fe_2O_3$); and a special cement such as an alumina cement (containing, as a metal oxide, CaO, $SiO_2$, $Al_2O_3$, $Fe_2O_3$, and MgO). Preferably, a portland cement is used.

The metal oxide-containing component contains, for example, 85 to 100 mass %, or preferably 90 to 99.5 mass % of the metal oxide and further contains, for example, 55 to 75 mass %, or preferably 60 to 70 mass % of the oxide of the Group 2 element.

The metal oxide-containing component is appropriately blended in accordance with the type of the carboxyl group-containing polymer and the content of the carboxyl group. To be specific, the metal oxide-containing component is blended at a mixing ratio of, for example, 5 to 200 parts by mass, preferably 10 to 180 parts by mass, or more preferably 25 to 100 parts by mass with respect to 100 parts by mass of the carboxyl group-containing polymer.

When the mixing proportion of the metal oxide-containing component is below the above-described range, the gel fraction (described later) of the adhesive composition is not in a desired range and the desired properties (the adhesive force, the holding strength, or the like) may not be obtained. When the mixing proportion of the metal oxide-containing component exceeds the above-described range, the improvement of the properties in accordance with the excess may not be obtained.

Examples of the metal carbonate include a carbonate of a Group 2 element such as a magnesium carbonate, a calcium carbonate, a strontium carbonate, and a barium carbonate; a carbonate of a Group 12 element (a Group 12 element of the periodic table (Revised edition of IUPAC Inorganic Chemistry Nomenclature (1989)) such as a zinc carbonate; and a carbonate of a transition element such as a manganese carbonate, a ferrous carbonate, a cobaltous carbonate, a nickelous carbonate, and a cupric carbonate. Preferably, a carbonate of a Group 2 element is used, or more preferably, a calcium carbonate is used.

When the metal carbonate is the carbonate of the Group 2 element, a metal ion can be easily produced and a cross-link can be formed by an ion bond of a metal ion in the metal carbonate with a carboxyl group in the carboxyl group-containing polymer.

Therefore, the above-described metal carbonate serves as a curing agent (or a cross-linking curing agent) of the moisture curing.

The metal carbonate is appropriately blended in accordance with the type of the carboxyl group-containing polymer and the content of the carboxyl group. To be specific, the metal carbonate is blended at a mixing ratio of, for example, 3 to 200 parts by mass, preferably 10 to 180 parts by mass, or more preferably 25 to 100 parts by mass with respect to 100 parts by mass of the carboxyl group-containing polymer.

When the mixing proportion of the metal carbonate is below the above-described range, the gel fraction (described later) of the adhesive composition is not in a desired range and the desired properties (the adhesive force, the holding strength, or the like) may not be obtained. When the mixing proportion of the metal carbonate exceeds the above-described range, the improvement of the properties in accordance with the excess may not be obtained.

A tackifier can be blended in the adhesive composition of the present invention as required.

Examples of the tackifier include a rosin resin, rosin esters, a terpene resin (for example, a terpene-aromatic liquid resin, a polyterpene resin, and the like), a coumarone resin, an indene resin, a coumarone-indene resin, a petroleum resin (for example, a C5 petroleum resin, a C5/C9 petroleum resin, and the like), and a phenol resin. Preferably, a coumarone resin is used.

The tackifier is blended at a mixing ratio of for example, 200 parts by mass or less, or preferably 1 to 100 parts by mass with respect to 100 parts by mass of the carboxyl group-containing polymer.

When the tackifier is blended in the adhesive composition, the adhesion can be imparted to the pressure-sensitive adhesive sheet and the adhesiveness of the pressure-sensitive adhesive sheet with respect to an object to be adhered can be improved.

A known additive can be appropriately blended in the adhesive composition of the present invention as required. Examples of the known additive include fillers, pigments, antioxidants, and flame retardants.

Examples of the filler include a hollow filler such as a hollow bead, a foamable filler such as a thermally foamable bead, and an inorganic filler such as talc, other than the above-described metal carbonate. Preferably, a hollow filler and a foamable filler are used.

When the filler is the hollow filler or the foamable filler, the apparent density of the pressure-sensitive adhesive sheet can be reduced, so that the weight reduction of the pressure-sensitive adhesive sheet can be achieved.

In order to prepare the adhesive composition, the carboxyl group-containing polymer, the plasticizer, the metal oxide-containing component and/or the metal carbonate, and if necessary, the tackifier and the additive are blended at the above-described mixing proportion to be mixed (kneaded) using, for example, a mixing roll, a pressurized kneader, an extruder, or the like. That is, the adhesive composition is prepared as a kneaded product.

The above-described preparation of the adhesive composition is performed by a solventless process, that is, without using, for example, a solvent such as ethyl acetate and toluene.

When the adhesive composition is prepared by the solventless process, the pressure-sensitive adhesive sheet can be easily formed into a desired shape (for example, a relatively thick sheet shape) and the environmental burdens can be reduced.

The kneaded temperature is, for example, 80 to 160° C., or preferably 100 to 140° C.

The above-described kneading is performed under, for example, a dry gas so that the above-described components or the kneaded product are not brought into contact with moisture.

Subsequently, the kneaded product is extended by applying pressure with a molding device such as a pressing machine, an extruder, or a calender roller to be formed into a sheet shape. In this way, the adhesive composition is formed into a sheet shape. When the adhesive composition is formed into a sheet shape, a substrate such as a non-woven fabric or a board can be disposed on both surfaces or one surface of the adhesive composition.

The thickness of the adhesive composition in a sheet shape is, for example, 0.1 to 10 mm, or preferably 0.5 to 5 mm.

After the above-described formation, the adhesive composition in a sheet shape is moisture-cured.

In order to moisture-cure the adhesive composition in a sheet shape, the adhesive composition in a sheet shape is humidified. To be specific, the adhesive composition in a sheet shape is allowed to stand under a normal humidity atmosphere, to be more specific, for example, under a normal temperature and normal humidity atmosphere, for, for example, 1 hour to 30 days, or preferably 10 hours to 7 days. The normal temperature and the normal humidity are described in JIS Z8703 and to be specific, are 5 to 35° C. and 45 to 85 RH %, respectively.

The adhesive composition in a sheet shape can be also humidified by being allowing to stand under, for example, a high humidity atmosphere, to be specific, for example, a high humidity atmosphere of more than 85 RH % and not more than 98 RH % at a temperature of 40 to 95° C., for, for example, 1 minute to 100 hours, or preferably 10 minutes to 24 hours.

The above-described humidification of the adhesive composition is performed by, for example, putting the adhesive composition into a constant temperature and high humidity chamber or the like.

When the metal oxide containing-component is contained, the adhesive composition absorbs the surrounding moisture by the above-described humidification and a metal hydroxide is produced by the reaction of water with the metal oxide. Thereafter, an ion bond is formed between a metal ion in the metal hydroxide and a carboxyl group in the carboxyl group-containing polymer, so that the adhesive composition moisture-cures.

When the metal carbonate is contained, the adhesive composition absorbs the surrounding moisture by the above-described humidification and an ion bond is formed between a metal ion in the metal carbonate and a carboxyl group in the carboxyl group-containing polymer, so that the adhesive composition moisture-cures.

The pressure-sensitive adhesive sheet of the present invention is obtained by the above-described moisture curing of the adhesive composition.

The obtained pressure-sensitive adhesive sheet (the adhesive composition after moisture curing) has the tackiness (adhesion) on its surface.

The following gel fraction of the pressure-sensitive adhesive sheet is, for example, 30 mass % or more, preferably 50 mass % or more, or more preferably 70 mass % or more, and is usually, 99 mass % or less.

Gel fraction: the percentage of the dry mass of the toluene-insoluble component (described in details in the evaluation method of Examples to be described later) at the time when the pressure-sensitive adhesive sheet is immersed in toluene for 24 hours with respect to the mass of the pressure-sensitive adhesive sheet before the immersion When the gel fraction is below the above-described range, the moisture curing of the adhesive composition is insufficient, so that the adhesive properties of the pressure-sensitive adhesive sheet may be reduced.

The thickness of the pressure-sensitive adhesive sheet (the adhesive composition after moisture curing) is, for example, 0.1 to 10 mm, or preferably 0.5 to 5 mm.

Thereafter, the pressure-sensitive adhesive sheet is attached to an object to be adhered. A plurality of the objects to be adhered (for example, an object to be adhered to which the pressure-sensitive adhesive sheet is attached and an object to be adhered to which the pressure-sensitive adhesive sheet is not attached) can be adhered via the pressure-sensitive adhesive sheet.

The pressure-sensitive adhesive sheet of the present invention can be easily formed into a predetermined shape, to be specific, into a film shape having a desired thickness (to be specific, thick).

The pressure-sensitive adhesive sheet of the present invention is easily stored after formation and before use, and can develop an excellent adhesive force with respect to an object to be adhered and an excellent holding strength at high temperature.

EXAMPLES

The present invention will now be described in more detail by way of Examples and Comparative Examples. However, the present invention is not limited to the following Examples and Comparative Examples.

Example 1

A monomer composition made of 85 parts by mass of butyl acrylate, 2 parts by mass of acrylic acid, and 15 parts by mass of acrylonitrile was polymerized, so that a carboxyl-modified acrylic polymer A (a carboxyl group-containing polymer, the content of the carboxyl group of 1.2 mass %, a solid content of 100%) was obtained.

Next, the acrylic polymer A, an adipate (Polycizer P-103, manufactured by DIC Corporation), and a white portland cement (a metal oxide containing-component, 66 mass % of CaO, 24 mass % of $SiO_2$, 4 mass % of $Al_2O_3$, 0.2 mass % of $Fe_2O_3$) were blended at a mixing proportion shown in Table 1 to be kneaded at 120° C. using a mixing roll, so that an adhesive composition was prepared.

The prepared adhesive composition was extended by applying pressure with a pressing machine to be formed into a sheet shape having a thickness of 1 mm.

Thereafter, the adhesive composition in a sheet shape was put in a constant temperature and high humidity chamber at 50° C. and 92 RH % to be allowed to stand for 12 hours, so that the adhesive composition was moisture-cured. In this way, a pressure-sensitive adhesive sheet was obtained.

Examples 2 to 4 and Comparative Example 1

A pressure-sensitive adhesive sheet was obtained in the same manner as in Example 1, except that the components were blended at a mixing proportion shown in Tables 1 and 3.

Example 5

A monomer composition made of 85 parts by mass of butyl acrylate, 6 parts by mass of acrylic acid, and 15 parts by mass of acrylonitrile was polymerized, so that a carboxyl-modified acrylic polymer B (a carboxyl group-containing polymer, the content of the carboxyl group of 3.5 mass %, a solid content of 100%) was obtained.

Next, a pressure-sensitive adhesive sheet was obtained in the same manner as in Example 1, except that the acrylic polymer B, an adipate (Polycizer P-103, manufactured by DIC Corporation), and a white portland cement (a metal oxide containing-component, 66 mass % of CaO, 24 mass % of $SiO_2$, 4 mass % of $Al_2O_3$, 0.2 mass % of $Fe_2O_3$) were blended at a mixing proportion shown in Table 1.

Comparative Example 2

The preparation of an adhesive composition was attempted in the same manner as in Example 1, except that the components were blended at a mixing proportion shown in Table 3.

However, the adhesive composition was cured during the kneading, so that the pressure-sensitive adhesive sheet could not be obtained.

Comparative Examples 3 and 4

The components were blended at a mixing proportion shown in Table 3 to be stirred and mixed at normal temperature, so that a toluene solution of the adhesive composition was prepared.

Next, the toluene solution of the adhesive composition was applied to the surface of a substrate to be dried at 100° C. and a film made from the resin composition was formed. The obtained film was put in a constant temperature and high humidity chamber at 50° C. and 92 RH % to be allowed to stand for 12 hours, so that the adhesive composition was moisture-cured. In this way, a pressure-sensitive adhesive sheet having a thickness of 0.05 mm of Comparative Example 3 and a pressure-sensitive adhesive sheet having a thickness of 1 mm of Comparative Example 4 were obtained.

However, the pressure-sensitive adhesive sheet of Comparative Example 4 foamed.

Example 6

A monomer composition made of 85 parts by mass of butyl acrylate, 2 parts by mass of acrylic acid, and 15 parts by mass of acrylonitrile was polymerized, so that a carboxyl-modified acrylic polymer A (a carboxyl group-containing polymer, the content of the carboxyl group of 12 mass %, a solid content of 100%) was obtained.

Next, the acrylic polymer A, an adipate (Polycizer P-103, manufactured by DIC Corporation), and a calcium carbonate were blended at a mixing proportion shown in Table 2 to be kneaded at 120° C. using a mixing roll, so that an adhesive composition was prepared.

The prepared adhesive composition was extended by applying pressure with a pressing machine to be formed into a sheet shape having a thickness of 1 mm.

Thereafter, the adhesive composition in a sheet shape was put in a constant temperature and high humidity chamber at 50° C. and 92 RH % to be allowed to stand for 12 hours, so that the adhesive composition was moisture-cured. In this way, a pressure-sensitive adhesive sheet was obtained.

Examples 7 to 9

A pressure-sensitive adhesive sheet was obtained in the same manner as in Example 1, except that the components were blended at a mixing proportion shown in Table 2.

Example 10

A monomer composition made of 85 parts by mass of butyl acrylate, 6 parts by mass of acrylic acid, and 15 parts by mass of acrylonitrile was polymerized, so that a carboxyl-modified acrylic polymer B (a carboxyl group-containing polymer, the content of the carboxyl group of 3.5 mass %, a solid content of 100%) was obtained.

A pressure-sensitive adhesive sheet was obtained in the same manner as in Example 1, except that the acrylic polymer B, an adipate (Polycizer P-103, manufactured by DIC Corporation), and a calcium carbonate were blended at a mixing proportion shown in Table 2.

Evaluation Method

1. Measurement of Adhesive Force

The adhesive force of the pressure-sensitive adhesive sheets obtained in Examples 1 to 10, and Comparative Examples 1 and 3 with respect to a cold rolling steel plate was measured in conformity with JIS K6854-3 (Adhesives-Determination of peel strength of bonded assemblies-Part 3: Adhesives-180 degree peel test for flexible-to-flexible bonded assemblies (T-peel test), 1999). The results are shown in Tables 1 to 3.

Both of the sizes of the pressure-sensitive adhesive sheet and the cold rolling steel plate used in the measurement were 25×150 mm.

2. Measurement of Holding Strength

The holding strength of the pressure-sensitive adhesive sheets obtained in Examples 1 to 10, and Comparative Examples 1 and 3 was measured by the following method.

That is, the pressure-sensitive adhesive sheet was cut into a size of 25×25 mm and the cut piece was attached to the center of the cold rolling steel plate (one) having a thickness of 0.8 mm and a size of 25×150 mm. Then, the pressure-sensitive adhesive sheet was attached to another cold rolling steel plate (the other, the same size as that of one cold rolling steel plate), so that two cold rolling steel plates were adhered to each other by the pressure-sensitive adhesive sheet.

Thereafter, one cold rolling steel plate was fixed and a 300-gram weight was applied to the other cold rolling steel plate to be vertically hung down under the condition of 80° C. Then, a duration till when the other cold rolling steel plate fell was measured. The results are shown in Tables 1 to 3.

3. Measurement of Gel Fraction

The gel fraction (a toluene-insoluble component) of the pressure-sensitive adhesive sheets obtained in Examples 1 to 10, and Comparative Examples 1 and 3 was measured.

That is, the pressure-sensitive adhesive sheet (about 0.2 g) was weighed and then, was immersed in an ethyl acetate (50 g) for 24 hours. Thereafter, the obtained product was filtrated with a wire net in 300 mesh and the toluene-insoluble component captured in the wire net was dried to be then weighed. Then, the percentage of the dry mass of the toluene-insoluble component with respect to the mass of the pressure-sensitive adhesive sheet before the immersion (=(the dry mass of the toluene-insoluble component)/(the mass of the pressure-sensitive adhesive sheet before the immersion)×100) was calculated. The results are shown in Tables 1 to 3.

TABLE 1

| Examples | | | Ex. 1 | Ex. 2 | Ex. 3 | Ex. 4 | Ex. 5 |
|---|---|---|---|---|---|---|---|
| Mixing Formulation of Adhesive Composition | Carboxyl Group-Containing Polymer | Acrylic Polymer A | 100 | 100 | 100 | 100 | — |
| | | Acrylic Polymer B | — | — | — | — | 100 |
| | Plasticizer | Adipate | 75 | 75 | 75 | 75 | 50 |
| | Metal Oxide Containing-Component | White Portland Cement | 50 | 50 | 5 | 150 | 50 |
| | Tackifier | Coumarone Resin | — | 75 | 50 | 50 | 50 |
| | Filler | Talc | — | — | — | — | — |
| | Cross-Linking Agent | Diphenylmethane Diisocyanate | — | — | — | — | — |
| | Solvent | Toluene | — | — | — | — | — |
| | Mixing Temperature (° C.) | Kneaded Temperature*1 | 120 | 120 | 120 | 120 | 120 |
| | | Stirring Temperature | — | — | — | — | — |
| Pressure-Sensitive Adhesive Sheet | Thickness Evaluation | (mm) | 1 | 1 | 1 | 1 | 1 |
| | | Adhesive Force (N) | 20 | 80 | 80 | 85 | 100 |
| | | Holding Strength (min) | 60 or more | 60 or more | 60 or more | 60 or more | 60 or more |
| | | Gel Fraction (mass %) | 80 | 76 | 72 | 85 | 80 |

*1Temperature of mixing roll
*2Cured during the kneading and therefore not formed into a sheet shape
*3Sheet foams and therefore not evaluated

TABLE 2

| Examples | | | Ex. 6 | Ex. 7 | Ex. 8 | Ex. 9 | Ex. 10 |
|---|---|---|---|---|---|---|---|
| Mixing Formulation of Adhesive Composition | Carboxyl Group-Containing Polymer | Acrylic Polymer A | 100 | 100 | 100 | 100 | — |
| | | Acrylic Polymer B | — | — | — | — | 100 |
| | Plasticizer | Adipate | 75 | 75 | 75 | 75 | 50 |
| | Metal Carbonate | Calcium Carbonate | 50 | 50 | 5 | 150 | 50 |
| | Tackifier | Coumarone Resin | — | 75 | 50 | 50 | 50 |
| | Filler | Talc | — | — | — | — | — |
| | Cross-Linking Agent | Diphenylmethane Diisocyanate | — | — | — | — | — |
| | Solvent | Toluene | — | — | — | — | — |
| | Mixing Temperature (° C.) | Kneaded Temperature*1 | 120 | 120 | 120 | 120 | 120 |
| | | Stirring Temperature | — | — | — | — | — |
| Pressure-Sensitive Adhesive Sheet | Thickness Evaluation | (mm) | 1 | 1 | 1 | 1 | 1 |
| | | Adhesive Force (N) | 20 | 80 | 80 | 85 | 100 |
| | | Holding Strength (min) | 60 or more | 60 or more | 60 or more | 60 or more | 60 or more |
| | | Gel Fraction (mass %) | 80 | 76 | 72 | 85 | 80 |

*1Temperature of mixing roll
*2Cured during the kneading and therefore not formed into a sheet shape
*3Sheet foams and therefore not evaluated

TABLE 3

| Comp. Examples | | | Comp. Ex. 1 | Comp. Ex. 2 | Comp. Ex. 3 | Comp. Ex. 4 |
|---|---|---|---|---|---|---|
| Mixing Formulation of Adhesive Composition | Carboxyl Group-Containing Polymer | Acrylic Polymer A | 100 | 100 | 100 | 100 |
| | | Acrylic Polymer B | — | — | — | — |
| | Plasticizer | Adipate | 75 | 75 | 75 | 75 |
| | Tackifier | Coumarone Resin | — | 50 | 50 | 50 |
| | Filler | Talc | 50 | — | — | — |
| | Cross-Linking Agent | Diphenylmethane Diisocyanate | — | 1 | 1 | 1 |
| | Solvent | Toluene | — | — | 300 | 300 |
| | Mixing Temperature (° C.) | Kneaded Temperature*1 | 120 | 120 | — | — |
| | | Stirring Temperature | — | — | Normal Temperature | Normal Temperature |
| Pressure-Sensitive | Thickness | (mm) | 1 | —*2 | 0.05 | 1 |
| | Adhesive Force (N) | | 22 | | 50 | —*3 |

TABLE 3-continued

| Comp. Examples | | | Comp. Ex. 1 | Comp. Ex. 2 | Comp. Ex. 3 | Comp. Ex. 4 |
|---|---|---|---|---|---|---|
| Adhesive Sheet | Evaluation | Holding Strength (min) | 5 | | 60 or more | |
| | | Gel Fraction (mass %) | 0 | | 75 | |

*[1]Temperature of mixing roll
*[2]Cured during the kneading and therefore not formed into a sheet shape
*[3]Sheet foams and therefore not evaluated In Tables 1 to 3, values for the components in the row of "Mixing Formulation of Adhesive Composition" show, as long as not particularly specified, the number of blended parts by mass of each of the components.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

Industrial Applicability

The pressure-sensitive adhesive sheet of the present invention is used in adhesion of various members.

The invention claimed is:

1. A pressure-sensitive adhesive sheet made from an adhesive composition containing a carboxyl group-containing polymer having a carboxyl group,
a plasticizer, and
a calcium carbonate as a cross-linking curing agent,
obtained by allowing the adhesive composition to moisture-cure, wherein the carboxyl group-containing polymer is obtained by polymerizing a monomer composition containing 45 to 90 mass % of an alkyl (meth) acrylate monomer,
0.1 to 10 mass % of a carboxyl group-containing vinyl monomer, and
5 to 50 mass % of a cyano group-containing vinyl monomer, and
has pressure-sensitive properties obtained after the moisture curing, wherein
the following gel fraction thereof is 30 mass % or more,
Gel fraction: the percentage of the dry mass of the toluene-insoluble component at the time when the pressure-sensitive adhesive sheet is immersed in toluene for 24 hours with respect to the mass of the pressure-sensitive adhesive sheet before the immersion.

2. The pressure-sensitive adhesive sheet according to claim 1, wherein
the adhesive composition is obtained by humidification after being formed into a sheet shape.

3. The pressure-sensitive adhesive sheet according to claim 1, wherein
the adhesive composition is formed into a sheet shape after being prepared by a-solventless process.

4. The pressure-sensitive adhesive sheet according to claim 1, wherein
the adhesive composition further contains a tackifier.

* * * * *